United States Patent

[11] 3,615,458

[72] Inventor Rinse Dykstra
Emmasingel, Eindhoven, Netherlands
[21] Appl. No. 744,409
[22] Filed July 12, 1968
[45] Patented Oct. 26, 1971
[73] Assignee U.S. Philips Corporation
New York, N.Y.
The portion of the term of the patent subsequent to June 29, 1988, has been disclaimed.

[54] PHOTOSENSITIVE HEXAVALENT CHROMIUM COMPOUND CONTAINING POLYVINYL ALCOHOL COMPOSITION AND METHOD OF USING
5 Claims, 1 Drawing Fig.

[52] U.S. Cl. .......... 96/36, 96/36.1, 96/93
[51] Int. Cl. .......... G03c 1/66, G03c 5/22
[50] Field of Search .......... 96/36.1, 75, 93, 36

[56] References Cited

UNITED STATES PATENTS

| | | | |
|---|---|---|---|
| 2,522,771 | 9/1950 | Barnes et al. | 96/93 X |
| 3,265,527 | 8/1966 | Adelman | 96/93 X |
| 3,309,202 | 3/1967 | Silver | 96/93 X |
| 3,317,319 | 5/1967 | Mayaud | 96/36.1 |
| 3,342,594 | 9/1967 | Kaplan | 96/36.1 |
| 3,471,294 | 10/1967 | Vander Sanden et al. | 96/93 |
| 3,461,077 | 8/1969 | Kobayashi et al. | 96/36.1 |

OTHER REFERENCES

Tritton; F. J., " The Photographic Journal," June. 1929, p. 281-285.

Kosav; J., " Light-Sensitive Systems," 1965, p. 88-90.

*Primary Examiner*—Charles L. Bowers, Jr.
*Attorney*—Frank R. Trifari

ABSTRACT: Photosensitive lacquer having a pH of between 6.7 and 8.2 and containing polyvinyl alcohol, a light sensitive chromium compound for hardening the alcohol, a dipolar aprotic substance. The lacquer layers may be dried at temperatures up to about 100° C. without causing hardening of the polyvinyl alcohol.

The invention relates to a photosensitive lacquer which consists of a solution in water of polyvinyl alcohol (PVA) in which a hexavalant chromium compound is present, to a method of preparing such lacquers, and to their use in manufacturing patterns according to a photomechanical method.

The photosensitive lacquers which are known as such and which consist of a solution of polyvinyl alcohol in which a compound is present containing a hexavalent chromium, are used in various sectors of technology, for example, in manufacturing lithographic plates for offset printing, in which the photohardened layer serves as an ink-absorbing layer, in manufacturing printed circuits in which the photohardened layer serves as an etching resist and in manufacturing picture screens for cathode-ray tubes in which a pattern of substances luminescing upon excitation by electrons is provided on the screen with a photosensitive lacquer.

In all these methods the quality of the photosensitive lacquer is very important. The quality is determined inter alia by the shelf life of the photolacquer, the photosensitivity of layers obtained with the photolacquer, and the extent to which the so-called dark reaction in a layer obtained with the photolacquer can occur and which may give rise to hardening of the lacquer on nonexposed, thus undesired, places. The photosensitive lacquers commonly used in the art and consisting of a solution in water of polyvinyl alcohol usually contain ammonium bichromate or ammonium chromate, which latter compound, on drying the lacquer layer, is converted into ammonium dichromate, while ammonia ($NH_3$) volatilizes. Other bichromates which are sometimes used are potassium bichromate and sodium bichromate.

PHOTOSENSITIVE HEXAVALENT CHROMIUM COMPOUND CONTAINING POLYVINYL ALCOHOL COMPOSITION AND METHOD OF USING

In an earlier patent application, applicants have described that by the addition of particular dipolar aprotic substances to photolacquers, consisting of a solution in water of polyvinyl alcohol and a bichromate compound, a photosensitive layer manufactured therefrom becomes insoluble more rapidly on exposure than layers which have been obtained with lacquers without said addition.

The acceleration of the light-hardening reaction is not associated with a proportional acceleration of the dark reaction as is found with other accelerators. When using photolacquers which contain a dipolar aprotic substance, the exposure time may be chosen to be shorter than when using photolacquers without said addition.

The dark reaction consists of a thermal reduction of the hexavalent chromium in the photolacquer. The result of the dark reaction is that during drying, the lacquer layer becomes insoluble to a certain degree independent of the subsequent exposure. The extent of becoming insoluble as a result of the dark reaction depends upon the time which elapses between the application of the photosensitive layer on a substrate and the development after exposure, and upon the temperature. This latter dependence results in comparatively long drying times since in practice drying can only be carried out at room temperature or slightly above said temperature (approximately 25° C.) and with a relative humidity of the air which is accurately maintained.

The pH of a photolacquer consisting of a solution in water of polyvinyl alcohol and bichromate is smaller than six.

It is known, see for example "Light-Sensitive Systems" by Jaromir Kosar, published by John Wiley and Sons, Inc., New York, London, Sydney, pp. 88 and 89, that the keeping quality of a photosensitive lacquer and of the layers manufactured by means of said lacquer is considerably improved by increasing the pH of a photolacquer of this type by means of an alkaline substance which does not volatilize when the lacquer layer is dried. The photosensitivity of lacquer layers obtained in this manner, however, is small. This is a result of the conversion of the bichromate into chromate in an alkaline medium, which is associated with a decrease of the photosensitivity of the system. The improvement of the keeping quality of the lacquer is to be ascribed, according to the literature (loc.cit.) to a shift of the equilibrium:

$Cr_2O_7a2^1 \rightleftharpoons 2CrO_4^{21}$ to the right at a pH of seven or higher. Therefore no chromic acid ($H_2CrO_4$) can be formed in the medium which according to the reaction equations:

$$2H_2CrO_4 + 6H^+ + 3\ominus \longrightarrow 2Cr^{3+} + 5H_2O + 3O$$

and $=CHOH$(polyvinyl alcohol)$+O \rightarrow =C=O + H_2O$ is held responsible for the dark reaction in the lacquer solution. The decrease of the photosensitivity of the lacquer layers manufactured with such lacquers, is also to be ascribed to the shift of the equilibrium $$Cr_2O_7a2^1 \rightleftharpoons 2CrO_4^{21}$$

to the right, so that both the concentration of the $Cr_2O_7^{21}$ ion and of the intermediately formed $HCrO_4^1$ ion is reduced. It is just these ions to which, according to the literature, photosensitivity is ascribed and which in combination with the polyvinyl alcohol are responsible for the light reaction.

The decrease in concentration of the ions $Cr_2O_7^{21}$ and $HCrO_4^1$ when the pH is increased, that is to say decrease of the H+ -ion concentration and increase of the OH-ion concentration, follows from $$Cr_2O_7a2^1 + H_2O \rightleftharpoons 2H^+ + 2CrO_4^{21} \quad 1.$$

$$CrO_4^{21} + H_2O \rightleftharpoons HCrO_4^1 + OH^1 \quad 2.$$

According to Carriere and Gastel "Compt. Rend," 187, p. 1,292, 1928 the equilibrium constant for the equilibrium according to equation 1 at room temperature $K_{18}=3\times10^{15}$. From this it can be calculated that in a 0.03 molar chromate solution (a commonly used concentration in the present photolacquers) at a pH=6.5 still 50% of the hexavalent chromium is present as bichromate, at pH=7.25 still 10% and at pH=7.5 less than 2 %.

It is the object of the invention to suppress the dark reaction in photosensitive lacquers consisting of an aqueous solution of polyvinyl alcohol containing a hexavalent chromium compound so as to achieve an improved keeping quality of the lacquer and the layers obtained with the said lacquer and to enable the drying of the lacquer layers at temperatures above room temperature.

According to the invention these conditions are fulfilled with a photosensitive lacquer comprising polyvinyl alcohol and hexavalent chromium, if the lacquer contains:

a. so much of a basically reacting substance which does not volatilize upon drying of the photosensitive lacquer layer manufactured by means of the photolacquer, that the pH of the photolacquer lies between 6.7 and 8.2, and b. a dipolar aprotic substance, which is fully water-miscible and has a boiling point above that of water.

At a pH below 6.7 it is found that the dark reaction in practice is not sufficiently suppressed. In contrast with photosensitive lacquers which contain no dipolar, aprotic substances, the photosensitivity does not immediately decrease when the pH is increased. A significant decrease of the photosensitivity in the photo lacquers in accordance with the invention is found only at approximately pH 8, above pH 8.2 the photosensitivity decreases to a value which is no longer practical.

A dipolar aprotic substance is to be understood to mean a compound which has a dipole and which is not capable of splitting off protons or of forming hydrogen bridges with substances which have nucleophilic groups. The dipolar aprotic substances are not capable, or are capable only to a slight extent, of effecting solvolysis of negatively charged ions.

The photosensitivity of photolacquers according to the invention is found to be equal to or only slightly less than the photosensitivity of photolacquers having a pH<6. In the light of the reaction mechanism assumed in the literature for the light reaction and the experience that if the bichromate as such is replaced by an equivalent quantity of the chromate the photosensitivity strongly decreases, this is particularly surprising. The effect aimed at does not occur when ammonium chromate is used in the photolacquer according to the invention. Upon drying a lacquer layer obtained with an ammonium chromate containing photolacquer the following reaction takes place while forming ammonium bichromate and $NH_3$ which disappears from the lacquer layer:

$$2(NH_4)_2CrO_4 \longrightarrow (NH_4)_2Cr_2O_7 + 2\,NH_3\uparrow + H_2O.$$

The acidity of the lacquer layer decreases so that the dark reaction in the lacquer layer is again stimulated. Chromates which may be used in the photo lacquers according to the invention are the chromates of lithium, sodium, magnesium, and tetraalkyl ammonium bases, for example, tetramethyl ammonium chromate and tetraethylammonium chromate. Decisive of the choice of the chromate is in many cases the requirement that the chromate, in the required concentration in the dry lacquer layer, does not crystallize out in the presence of the dipolar aprotic substance. Potassium chromate, for example, is therefore found to be less suitable. It can rapidly be determined by a few simple experiments what combination does not give rise to crystallization. According to another aspect of the invention dipolar aprotic substances which are oxidized in photolacquers which contain bichromate compounds, for example, dimethyl sulfoxide, may without objection be used in the photolacquers according to the invention. Any noticeable oxidation of said substance in the photolacquers according to the invention does not occur. Other dipolar aprotic substances which may be used in the photolacquers according to the invention are γ-butyrolactone, N-methyl-α-pyrrolidone, ethylenecarbonate, sulfolane, dimethylacetamide, dimethylformamide, hexamethylphosphoramide and tetramethylurea.

In order to obtain a homogenous lacquer layer it is desirable that the dipolar aprotic substances be water-miscible in all ratios at room temperature. It has been found necessary for reaching the desired effect that the boiling point of the dipolar aprotic substance is higher than that of water. The above-mentioned dipolar aprotic substances fulfill both requirements.

γ-Butyrolactone is slightly hydrolized by water. During this hydrolysis protonic compounds are formed which produce a decrease of the pH of the lacquer and thus the formation of bichromate from chromate. Said substance may be used, however, if a rapid processing after the preparation of the photolacquer is possible, since otherwise the desired effect, namely the suppression of the dark reaction, is fully or partly lost by a decrease of the pH and the formation of bichromate in the photolacquer The starting materials in the preparation of the photolacquers may be chromic acid, bichromates, and chromates of nonvolatile bases, and bichromates and chromates of volatile bases.

The desired quantity of hexavalent chromium is added to the photolacquer in the form of a chromium compound, after which, dependent upon the type of chromium compound used, the following procedure is followed.

Chromic acid ($H_2CrO_4$): so much of a nonvolatile base (for example, NaOH, KOH, LiOH) is added to the chromic acid-containing photolacquer as is necessary for the formation of the bichromate, and so much of a nonvolatile base (for example NaOH, KOH, LiOH) is then added that the pH of the photolacquer reaches a value between 6.7 and 8.2.

Bichromate of a nonvolatile base (for example, $Na_2Cr_2O_7$, $K_2Cr_2O$, $Li_2Cr_2O_7$, $MgCr_2O_7$): so much of a nonvolatile base (for example, NaOh. KOH, LiOH) is added to the bichromate-containing photolacquer that the pH of the photolacquer reaches a valve between 6.7 and 8.2.

Chromate of a nonvolatile base (for example $Na_2CrO_4$, $K_2CrO_4$, $Li_2CrO_4$): if required, so much of an acid is added to the chromate-containing photolacquer that the pH of the photolacquer reaches a value between 6.7 and 8.2; for this purpose may suitably be used chromic acid if it is to be expected that otherwise disturbances would occur, for example, in drying the lacquer layer.

Bichromate and chromate of a volatile base (for example, $(NH_4)_2$Crb-2$O_7$ and $(NH_4)_2CrO_4$), respectively: so much of a nonvolatile base is added to the chromate- or bichromate-containing photolacquer that a full conversion into the chromate of the nonvolatile base has taken place. The pH value of the photolacquer, however, is less suited as a controlling factor in this case for temporarily a strong increase of the pH may occur as a result of the libration of the volatile base, for example $NH_3$:

$(NH_4)_2Cr_2O_7 + 4NaOH \longrightarrow 2\,Na_2CrO_4 2NH_3\uparrow + 3H_2O$

In this method it is recommendable to add quantities of nonvolatile base which are calculated with reference to the experience obtained in preparing photolacquers at a pH between 6.7 and 8.2 according to the invention, with bichromates of nonvolatile bases. The pH then obtained may be above 8.2 as a result of the presence of ammonia ($NH_3$) but this has no influence on the dark reaction and the photosensitivity of a lacquer layer manufactured by means of such a lacquer, since the ammonia disappears from the lacquer layer upon drying.

In the photolacquers according to the invention, the polyvinyl alcohols commonly used for this purpose may be used, for example, with a mean molecular weight between 60,000 and 120,000 and a saponification degree of, for example, 88%. Types having higher and lower saponification degrees may also be used.

A suitable composition of the photolacquer is:

3 to 10 g. of polyvinyl alcohol 0.1 to 1.0 milligrammolecules of chromate per gram of polyvinyl alcohol 0.15 to 0.4 g. of a dipolar aprotic substance per gram of polyvinyl alcohol water, complete to 100 g.

pH adjust to a value between 6.7 and 8.2.

The effect of the invention will be described in detail with reference to the accompanying drawing, the sole Figure of which shows four curves (A, B, C and D) which show the degree of dark reaction dependent upon the drying time of lacquer layers at 25° C. and 40° C. of a photolacquer according to the invention, and a conventional photolacquer.

The curves A and B relate to photosensitive lacquer layers of 5 μm thickness, dried at 40° C. and 25° C., respectively, manufactured with a photolacquer of the following composition:

0.4 milligrammolecules $(NH_4)_2Cr_2O_7$ 1 g. PVA (Elvanol 52–22)

0.2 g. N.methyl-α-pyrrolidone water sufficient to form 14 g. of lacquer the pH of this photolacquer is 5.2.

The curve C/D which in fact consists of two coinciding curves relates to photosensitive lacquer layers dried at 40° C. and 25° C. respectively, manufactured with a photolacquer according to the invention of the following composition:

0.4 milligrammolecules tetramethylammonium chromate 1 g. PVA (Elvanol 52–22)

0.3 g. dimethylsulphoxide water sufficient to form 14 g. of lacquer the pH of this photolacquer was adjusted to 6.95.

The following measurements were performed: after drying the lacquer layer at 25° C. and 40° C., respectively, for a number of minutes, the lacquer layer was exposed to light. Between the light source and the photosensitive lacquer layer were arranged a mask provided with a pattern of holes and a so-called graded grey filter with factor =0.15, that is to say, the difference between the logarithm of the transmission of two successive stages is 0.15.

It was now determined what percentage of the total quantity of light was just necessary to obtain a satisfactorily adhering pattern of dots on the substrate with the photosensitive lacquer with the drying time stated. In this connection it is to be considered, that in case a dark reaction occurs, a smaller quantity of light is necessary for this purpose, a certain extent of hardening having already taken place in the photosensitive layer. The points found in this manner form the curves shown in the drawing.

On the vertical axis of the Figure the quantity of light is plotted in percent. The light source was a water-cooled super-high pressure mercury discharge lamp of 500 watt with glass window, and the exposure time was 4 min.

The drying times are plotted on the horizontal axis.

The following may be obvious from the Figure:

Curve A: Upon drying the lacquer layer at 40° C., such a strong dark reaction occurs that the relative quantity of light for obtaining a satisfactorily adhering recognisable pattern of dots decreases rapidly. When the drying time exceeds 60 minutes, a defined pattern of dots can no longer be obtained, the lacquer layer has already become insoluble for the greater part without exposure.

Curve B: Drying at 25° C. shows a similar picture, but the dark reaction is less rapid in this case.

Curve C/D: Drying at 40° C., ( x ) and at 25° C., ( O ), respectively, shows that no dark reaction occurs in the lacquers according to the invention. The relative quantity of light just required to obtain a satisfactorily adhering spot pattern remains constant.

It is to be noted that although according to curves A and B satisfactorily adhering and recognisable patterns of dots occur also when the dark reaction occurs, this does not mean that these lacquers can still be used after so many minutes of drying. After some time, a persistently adhering PVA layer hardened as a result of the dark reaction is present between the dots. For example, a substrate which is coated with such a layer can not be etched according to the desired pattern.

In order that the invention may be readily carried into effect, the preparation of the photolacquers according to the invention will now be described in detail with reference to the invention ensuing specific examples. In the examples 1 to 10 chromate is referred to, since the hexavalent chromium is present in these lacquers for more than 50% as chromate.

EXAMPLE 1

Composition of the lacquer:

7.5 g. PVA (Elvanol 52–22)

3 milligrammolecules lithium chromate ( 3 milligramatoms of hexavalent chromium).
2.25 g. dimethylsulphoxide
water sufficient to form 100 g. of lacquer.
The lithium chromate was added as such.

The pH of the lacquer was adjusted at 6.8 with a small amount of sulfuric acid.

Glass plates which were degreased with a mixture of bichromate-sulphuric acid and then rinsed with deionized water were provided with a lacquer layer, thickness between 0.010 and 0.012 mm. For this purpose, an excess of lacquer of the above composition was provided on the glass plates, the lacquer was evenly distributed on the glass surface by centrifuging while the desired thickness of the lacquer layer was adjusted by controlling the number of revolutions. The lacquer layer was then dried in air at 50° C., for 15 min.

The dried lacquer layer was exposed to the light of a water-cooled high-pressure mercury lamp at a distance of 50 cm. A mask consisting of a blackened plate and having a large number of regularly arranged holes of diameter 0.4 mm. was arranged between the lacquer layer and the light source at a distance of 1 mm. from and parallel to the lacquer layer. A diaphragm was arranged between the mask and the light source with which it was possible to expose parts of the photosensitive lacquer layer of 1.5×6 cm. for 0.5, 1, 2, 4 and 8 minutes, respectively. Exposure took place immediately after or at any rate within X 15 minutes after drying. After drying the layer was developed at room temperature, that is to say the nonexposed parts of the lacquer layer were washed away with slowly running water. The resulting picture was dried in air. The pictures obtained in this manner may be characterized as follows:

1. photosensitivity: it is determined what exposure time is necessary to obtain a correct reproduction, the requirement being imposed that all the holes of the mask are reproduced at the correct places as dots of a somewhat larger diameter.
2. Dark reaction: it is examined whether lacquer is to be found on nonexposed places after the development. According to these methods it was established that, when using the composition of the lacquer described in this example, a correct picture is found after an exposure time of 2, 4 and 8 minutes. Dark reaction does not occur.

EXAMPLE 2

Composition of the lacquer:
7.5 g. PVA (Elvanol 52–22)
3 milligrammolecules lithium chromate
1.5 g. ethylene carbonate
sufficient water to form 100 g. of lacquer
the pH of the lacquer was adjusted to 6.8 with a small amount of sulfuric acid.

The photosensitivity and the dark reaction were determined in the manner described in example 1 and were found to be identical to the results obtained with the lacquer obtained according to example 1.

EXAMPLE 3

Composition of the lacquer:
7.5 g. PVA (Elvanol 52–22)
1 milligrammolecules sodium chromate (contains 1 milligram atoms of hexavalent chromium)
2.25 g. of dimethyl sulfoxide
sufficient water to form 100 g. of lacquer 2 milligrammolecules of chromic acid and less than the calculated quantity of sodium hydroxide solution were added to the lacquer for a complete conversion into sodium chromate; then so much sodium hydroxide solution was added until the pH reached a value of 7.4. The photosensitivity and the dark reaction were determined in the manner described in example 1 and were found to be identical to the results obtained with the lacquer according to example 1.

EXAMPLE 4

Composition of the lacquer:
7.5 g. PVA (Elvanol 52–22)
2 milligrammolecules sodium chromate (contains 2 milligram-atoms hexavalent chromium)
1.2 g. sulphone
sufficient water to form 100 g. of lacquer The sodium chromate and the pH adjustment were obtained as described in example 3.

The photosensitivity and the dark reaction were determined in the manner described in example 1 and were found to be identical to the results obtained with the lacquer according to example 1.

EXAMPLE 5

Composition of the lacquer:
7.5 g. PVA (Elvanol 52–22)
3 milligrammolecules tetramethylammonium chromate (contains 3 milligram-atoms hexavalent chromium)
2.25 g. of dimethylsulphoxide
sufficient water to form 100 g. of lacquer The tetramethyl ammonium chromate and the pH adjustment were obtained as described in example 3 in which the quaternary tetramethylammonium base was used instead of sodium hydroxide solution. In the manner described in example 1, the photosensitivity and the dark reaction were determined at various pH values, which were adjusted by means of the nonvolatile base.

Photosensitivity:
at pH 7.2 correct image after an exposure of 2, 4 and 8 minutes
pH 6.9 correct image after an exposure of 1, 2, 4 and 8 min.
pH 6.7 correct image after an exposure of 1, 2, 4 and 8 min.
Dark reaction:

Some dark reaction began to occur only at pH 6.7 after an exposure time of 8 minutes at pH 6.9 and 7.2 no dark reaction.

EXAMPLE 6

Composition of the lacquer:
7.5 g. PVA (Elvanol 52–22)
3 milligrammolecules tetramethylammonium chromate (contains 2 milligram-atoms of hexavalent chromium)
1.5 g. N-methyl-α-pyrrolidone
sufficient water to form 100 g. of lacquer For the preparation of tetramethylammonium chromate and the adjustment of the pH, see example 5.

In the manner as described in example 1, the photosensitivity and the dark reaction were determined at various pH values:

Photosensitivity:
at pH 7.3, correct image after an exposure time of 2, 4 and 8 min.
pH 6.9, correct image after an exposure time of 2, 4 and 8 min.
Dark reaction:
At pH 7.3 and at pH 6.9 no dark reaction.

EXAMPLE 7

In preparing the following lacquer ammonium bichromate was used as the starting material, from which, in the manner described above, tetramethylammonium chromate was prepared by the addition of the calculated quantity of quaternary tetramethyl ammonium base.

Composition of the lacquer:
7.5 g. PVA (Elvanol 52–22)
3 milligrammolecules of tetramethylammonium chromate (contains 3 milligram-atoms of hexavalent chromium)
2.25 g. of dimethylsulphoxide
sufficient water to form 100 g. of lacquer; the lacquer contains ammonia ($NH_3$). The photosensitivity and the dark reaction were determined at various pH-values in the manner described in example 1.

Photosensitivity:

at pH 9.8, correct image after an exposure time of 2, 4 and 8 min.
pH 9.3, correct image after an exposure time of 1, 2, 4 and 8 min.
Dark reaction:
no dark reaction at pH 9.8 and 9.3.

Since in fact the pH-values of 9.8 and 9.3 are a result of the presence of a volatile base which disappears upon drying the lacquer layer, the properties of the resulting lacquer layer are identical to those obtained with a lacquer according to the invention of pH 6.9 to 8.2 which contains no volatile base. So it appears that when the pH of the photolacquer has reached a value outside said range by the presence of a volatile base, such a lacquer, if the nonvolatile components present therein according to an analogy computation would yield a pH of 6.7 to 8.2, is to be considered to be equal to a photolacquer containing a nonvolatile base of pH 6.9 to 8.2 and is to be deemed to fall within the scope of the present invention.

EXAMPLE 8

Composition of the lacquer:
7.5 g. PVA (Vinavillol 42–88)
3 milligrammolecules tetramethylammonium chromate (contains 3 milligram atoms hexavalent chromium)
2.25 g. dimethylsulphoxide
sufficient water to form 100 g. of lacquer For the preparation of the tetramethylammonium chromate and the adjustment of the pH: see example 5.

The photosensitivity and the dark reaction were determined at various pH-values in the manner described in example 1.

Photosensitivity:
At pH 7.2, correct image after an exposure time of 4 and 8 minutes.
At pH 6.9 and 6.7 correct image after an exposure time of 2, 4 and 8 minutes.
Dark reaction:
absent.

EXAMPLE 9

Composition of the lacquer:
7.5 g. PVA (Rhodoviol 50–125)
3 milligrammolecules tetramethylammonium chromate (3 milligram atoms hexavalent chromium)
2.0 g. N-methyl-α-pyrrolidone
sufficient water to form 100 g. of lacquer For the preparation of the tetramethylammonium chromate and the adjustment of the pH: see example 5.

The photosensitivity and the dark reaction were determined at various pH-values in the manner as described in example 1.

Photosensitivity:
At pH 7.2, 6.9 and 6.7, correct image after an exposure time of 1, 2, 4 and 8 minutes.
Dark reaction:
At pH 7.2 and 6.9 absent.
At pH 6.7 only noticeable after an exposure time of 8 minutes.

EXAMPLE 10

In the composition of the lacquer as described in example 9, 2.0 g. of N-methyl-α-pyrrolidone were replaced by 2.25 g. of dimethyl sulfoxide. The photosensitivity and the dark reaction were quite similar to those found with the composition of the lacquer as described in example 9. For comparison examples 11 and 12 are described which relate to photolacquers having pH-values smaller than 6.7.

EXAMPLE 11

Composition of the lacquer:
5 g. PVA (Elvanol 52–22)
2 milligrammolecules $(NH_4)_2Cr_2O_7$
sufficient water to form 100 g. of lacquer
pH of this composition of lacquer 5.2.

In the manner described in example 1, the photosensitivity and the dark reaction were determined with the difference that drying was not carried out at 50° C. in air, as in examples 1 to 10, but drying was carried out at room temperature in air the relative humidity of which was maintained at 50%.

Photosensitivity:

| Exposure time in minutes | Result |
|---|---|
| 0.5 | a few dots |
| 1 | dots present image not correct |
| 2 | same as 1 min. exposure, image less disorderly |
| 4 | substantially correct image |
| 8 | correct image |

Dark reaction:
After an exposure time of 4 and 8 minutes dark reaction was present.

When the lacquer layer is dried at a temperature about 30° C., an inadmissible dark reaction takes place in the lacquer layer, which is also the case if too much time elapses between drying and development.

EXAMPLE 12

Composition of the lacquer:
5 g. PVA (Elvanol 52–22)
2 milligrammolecules $(NH_4)_2Cr_2O_7$
1 g. ethylene carbonate
sufficient water to form 100 g. of lacquer
the pH of the lacquer is 5.2.

The lacquer layers were dried at room temperature in air with 50% relative humidity.

In the manner described in example 1, the photosensitivity and the dark reaction were determined:

Photosensitivity:

| Exposure time in minutes | Result |
|---|---|
| 0.5 | All dots present, but image not correct |
| 1 | nearly correct image |
| 2 | correct image |
| 4 | correct image |
| 8 | correct image |

Dark reaction:
After an exposure time of 8 minutes the dark reaction was present. Drying above 30° C. was not possible in connection with the dark reaction. Not too much time may elapse between drying and development.

The substances identified in the examples by means of trade names have the following properties:

Elvanol 52–22 is a product of E. I. Dupont de Nemours and Co., Inc. U.S.A., which consists of polyvinyl alcohol having a saponification degree of 88% and a mean molecular weight of approximately 77,000. In a 4% solution it has a viscosity of 22 cP.

Vinavillol 42–88 is a product of Societa Generale per l'Industrie Mineraria e Chimica Montecatini, Italy which consists of polyvinyl alcohol having a saponification degree of 88% and a mean molecular weight of approximately 96,000. In a 4% aqueous solution it has a viscosity of 45 cP.

Rhodoviol 50–125 is a product of Rhone-Poulenc, S.A., France which consists of polyvinyl alcohol having a saponification degree of 89% and a mean molecular weight of approximately 105,000. In a 4% aqueous solution it has a viscosity of 50 cP.

The grey stage mentioned above is a product of Eastman Kodak, USA.

The water-cooled high-pressure discharge lamp of 500 watt used for exposing the lacquer layers is a product of N. V. Philips, Netherlands (SP500).

The invention presents the particular advantage that lacquer layers obtained with the composition of the lacquer according to the invention can be dried at a temperature above room temperature, so more rapidly than the conventional lacquers. Drying in a conditioned space is not necessary as in conventional lacquers in which the maintenance of a particular relative humidity of the air during drying is necessary. The lacquer layers according to the invention may be dried at temperatures between 40° and 100° C.

The photolacquers according to the invention may be used for all known purposes. When used for the manufacture of picture screens in which lacquers are used in which a pigment is dispersed which luminesces upon excitation with electrons, there exists a smaller possibility of attack by oxidation of the pigment than when using photosensitive lacquers having a pH below 6.7.

What I claim is:

1. A photosensitive lacquer capable of being dried at a temperature of about 25° C. to 100° C. to form a photosensitive layer, said lacquer consisting essentially of an aqueous solution of (A) polyvinyl alcohol, (B) a water-soluble photosensitive hexavalent chromium salt of a nonvolatile base, (C) a water-soluble or water-miscible dipolar aprotic compound having a boiling point greater than that of water and substantially insensitive to hydrolysis by water and (D) a sufficient amount of a nonvolatile base or acid, having a boiling point greater than that of water, to maintain the pH of the lacquer between 6.7 and 8.2 inclusive, said chromium salt and said base or acid being different compounds.

2. The lacquer of claim 1 wherein the chromium compound is selected from the group consisting of lithium chromate, sodium chromate, magnesium chromate, tetramethyl chromate and tetraethyl chromate.

3. The photosensitive lacquer of claim 1 wherein per 100 grams of solution there is present 3–10 grams of the polyvinyl alcohol, 0.1 to 1.0 mg. of chromium, in the form of the hexavalent chromium compound, per gram of the polyvinyl alcohol and from 0.15 to 0.4 grams of a dipolar aprotic substance per gram of the polyvinyl alcohol.

4. The photosensitive lacquer of claim 2 wherein the dipolar aprotic substance is selected from the group consisting of dimethyl sulfoxide, g-butyrolactone, N-methyl-α-pyrrolidone, ethylene-carbonate, dimethylacetamide dimethylformamide, hexamethylphospharamide and tetramethylurea and sulfolane.

5. A method of manufacturing a photohardened polyvinyl alcohol pattern on a substrate, comprising the steps, forming a layer of a photosensitive lacquer of claim 1 on a substrate, drying said layer in air at a temperature between 40° and 100° C., exposing said layer to light with the interposition of a mask having the desired pattern between the layer and the light source, developing said exposed layer by washing away the nonexposed parts and then drying the remaining photohardened polyvinyl alcohol.

* * * * *